Feb. 20, 1962 K. W. MAYNARD 3,021,887
TITANIUM STRETCH FORMING
Filed July 19, 1956

INVENTOR.
K. W. MAYNARD
BY S. Tierney, Jr
ATTORNEY

United States Patent Office 3,021,887
Patented Feb. 20, 1962

3,021,887
TITANIUM STRETCH FORMING
Kermit W. Maynard, National City, Calif., assignor to Rohr Aircraft Corporation, Chula Vista, Calif., a corporation of California
Filed July 19, 1956, Ser. No. 598,844
3 Claims. (Cl. 153—48)

In the stretch forming of thin metal sheets against a curved die to form the sheets to the shape of the die, it is necessary to grip the ends of each sheet in clamp jaws which apply a high tension to it. Such clamp jaws usually have knurled or otherwise roughened faces which engage the sheet for a distance of from 2 to 4 inches at each end and bite into it to grip it adequately. The length of the sheet before forming must therefore be greater than the distance along the face of the die by a distance of at least about 12 inches in order to provide end portions extending beyond the die to go between the clamping jaws. After the sheet is formed, the ends are usually cut off and become scrap material which is of little value. For example, if the distance along the curved face of the die is 30 inches and a flat sheet 42 inches long is used to form the workpiece, the 6 inches cut from each end of the finished part obviously represents a material wastage amounting to 40 percent of the finished part. If the sheet is made of steel, this wastage is not too costly but it is composed of titanium whose present cost is approximately $17.00 per pound, then the wastage is excessive from the monetary standpoint. It is a prime object of my invention to greatly reduce this wastage by making the sheet of expensive metal only long enough to extend along the face of the die and to bond to the opposite ends of the sheet strips of inexpensive metal which enter the clamp jaws and apply tension to the ends of the sheet.

Another object of the invention is secured by the aforedescribed construction in that the surface of the formed workpiece is left substantially unimpaired and smooth and is not damaged by indentations made by the gripping jaws of the clamps.

A further object is to provide a method for brazing a titanium sheet to a low carbon steel or stainless steel sheet by using resistance welding apparatus to heat the brazing metal.

Another object is to provide a composite sheet metal member having a thin center portion of large area and composed of expensive metal and two end portions of inexpensive ferrous alloy strongly brazed to the center portion.

Further objects will become apparent as a description of an embodiment of my novel structure proceeds. For a better understanding of the invention, reference is made to the accompanying drawing, in which.

Figure 1:
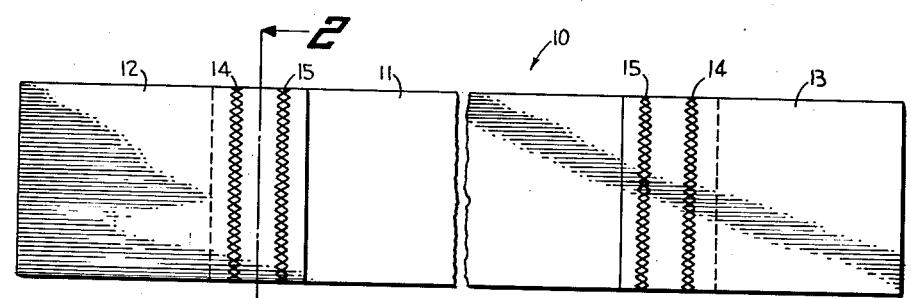
FIG. 1 is a top view of a composite metal sheet embodying the invention.
Figure 2:
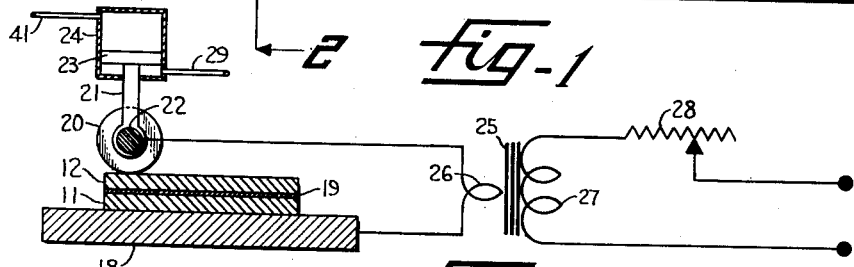
FIG. 2 is a sectional view of the sheet of FIG. 1 taken on line 2—2 also showing diagrammatically an electrical means for brazing component sheets together.
Figure 3:
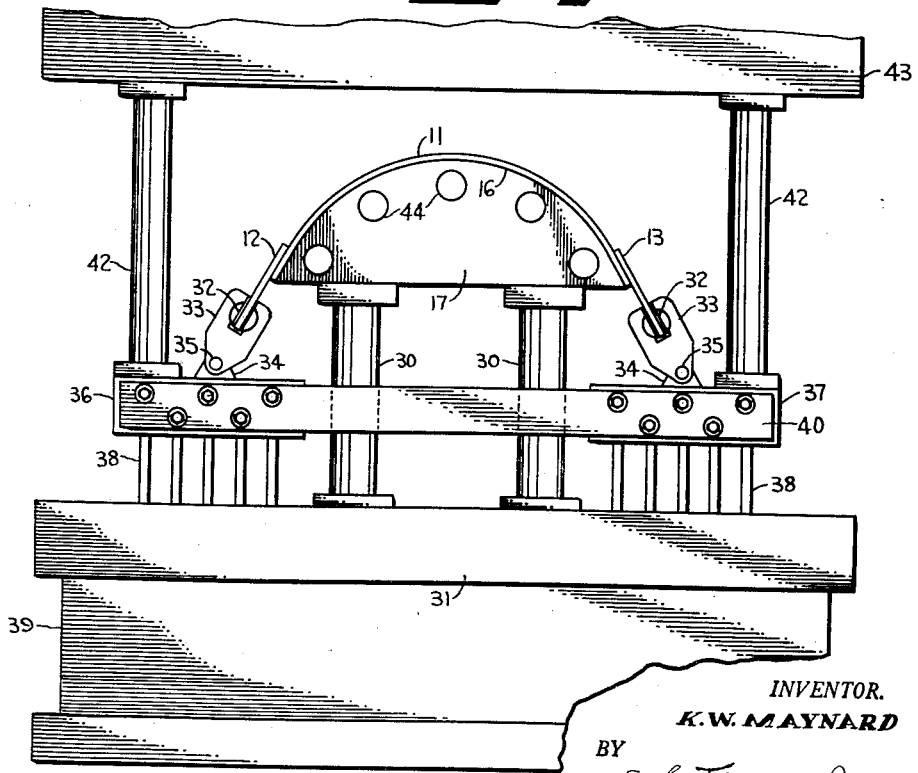
FIG. 3 is a front view of a stretch forming machine showing the composite sheet of FIG. 1 formed against the die of the machine.

The composite sheet 10 of FIG. 1 comprises a thin rectangular sheet 11 of titanium to the opposite ends of which are brazed two similar rectangular thin sheets 12, 13 of low carbon or preferably stainless steel. The ends of sheets 12, 13 overlie sheet 11 and are brazed thereto along parallel braze lines 14, 15. These lines are preferably spaced from ¼ to ½ inch apart and in certain cases where sheet 11 does not have to be subjected to a very large tensile stress to form it to the shape of the die, one of the braze lines 14 or 15 may be omitted.

The length of sheet 11 is preferably made equal to or only slightly longer than the distance measured along the curved top face 16 of die 17 to prevent wastage of the expensive titanium or other expensive ductile metal composing sheet 11.

To effect the brazing of sheet 12 to sheet 11, one end of sheet 11 is placed on the copper bedplate 18 of a resistance welding machine and a small rectangular strip 19 of brazing metal placed on top of the end of sheet 11. By making strip 19 approximately .002 inch thick of an alloy composed of 85% silver and 15% manganese, it is found that strong brazes can be secured by heating the parts in a manner similar to resistance welding. One end of sheet 12 is then placed on strip 19 and a copper welding roller 20 brought down on sheet 12 at one edge thereof. Any known means may be used to lower and apply pressure to roller 20, that illustrated comprising a piston rod 21 in the lower end of which a shaft 22 to which roller 20 is fast, is pivotally supported. The top of rod 21 has secured thereto a piston 23 slidable in a cylinder 24, pressurized fluid being supplied to cylinder 24 above piston 23 by a supply pipe 41. Welding or heating current is supplied to roller 20 by the circuit shown including a transformer 25 having a single turn secondary 26 and a primary winding 27 having a large number of turns. Sixty cycle current is supplied to primary 27 through a variable resistor 28 which controls the amplitude of the heating current. Roller 20 is advanced across sheet 12 while downward pressure is applied to strip 19 and heating current flows therethrough, the heat causing the portion of strip 19 directly under roller 20 to melt and braze the sheets 11 and 12 together along the line 14. Advancement of roller 20 may be effected by attaching cylinder 24 to a carriage (not shown) movable along horizontal rails on a fixed frame, the rails having rack teeth with which pinions mounted on the carriage mesh, all as shown in U.S. Patent No. 2,161,-430. Or alternatively cylinder 24 may be stationary and plate 18 extend into horizontal guideways, the plate being advanced by a pinion which meshes with rack teeth (not shown) formed on the bottom of the plate. Roller 20 is then raised by admitting fluid from pipe 29 into cylinder 24 under piston 23 and the attached sheets 11—12 advanced toward the left in FIG. 1 when the brazing operation is repeated along line 15.

Sheet 11 is then moved along plate 18 until its right hand end is under roller 20 when a second strip 19 of braze alloy is placed on top of sheet 11. The left hand end of sheet 13 is then placed on top of strip 19 and sheets 11 and 13 brazed together along the lines 14 and 15 by the method above described. An overlap of the sheets to be brazed of ¾-inch is found sufficient and upon testing the brazed joints, their strength was found greater than the tensile strength of titanium sheet 11.

The press shown for stretching sheet 11 against die face 16 is that disclosed in U.S. Patent No. 2,753,915, issued July 10, 1956, and comprises a plurality of supporting columns 30 for the die, the lower ends of the columns resting on a stationary bolster plate 31. The lower ends of sheets 12 and 13 are gripped by the jaws 32 of clamps 33, the lower end of each clamp being connected to a clamp support 34 by a pivot pin 35. The clamp supports 34 are carried by a pair of horizontal beams 36, 37 each of which is attached to and supported for vertical movement on a set of pressure pins on piston rods 38 slidable through plate 31. Plate 31 is supported on the main bed or base 39 of the press which is hollow and contains hydraulic or pneumatic cylinders (not shown) within which the lower ends of pins 38 extend and are slidable in a known manner. The beams 36—37 are connected together at their ends by a pair of similar beams 40, only one of which is shown. Beams 36—37 are attached to the lower ends of a plurality of drive columns 42 the upper ends of which are attached to the actuating ram 43 which is raised and lowered by power driving means (not shown) in a known manner. Ram 43 is lowered on its power stroke at a speed which is suitable for the particular metal composing sheet 11. For forming titanium die 17 is heated to a temperature within the range of 400° to 800° F. by a plurality of electric heaters 44 embedded in the die.

To stretch form sheet 11 to the shape of hot die face 16, with ram 43 and clamps 33 in their topmost positions composite sheet 10 is placed centrally over die 17 and the outer ends of sheets 12 and 13 inserted between clamp jaws 32 and the clamp jaws caused to grip the sheets by any known means (not shown) such as those disclosed in above noted Patent 2,753,915. Ram 43 is then lowered thereby depressing beams 36, 37 and all the clamps 33 by an amount sufficient to stretch sheet 11 somewhat beyond its elastic limit and cause it to permanently conform in shape to convex face 16 of the die. As the stretching proceeds, each clamp 33 is free to move on its pin 35 in a plane required by the tension in that region of the sheet as determined by the contour of the die. Ram 43 is then raised permitting pressure pins 38 to lift beams 36, 37 and clamps 33 thereby lifting sheet 11 slightly off the die. The clamp jaws 32 are now opened to permit the ends of sheets 12, 13 to be removed therefrom and the formed composite sheet 10 is removed from the press. In certain structures such a composite sheet may be used as is; in other structures only the center portion 11 which was in contact with die face 16 may be needed. In the latter case, the outer ends of sheets 12 and 13 may be trimmed off as required.

Since titanium sheet 11 increases in length substantially when stretched against die 17, the initial length of the sheet does not have to be equal to the distance measured along die face 16 in order for the stretched sheet to entirely cover the die face. If, for example, the distance along the die face is 30 inches, it has been found that the initial length of sheet 11 need be only from 27.5 to 28 inches in order for the stretched sheet to entirely cover die face 16 and be conformed to its shape. This aspect of my invention results in further saving in the use of expensive metal. While the invention may be used for stretching titanium sheets within a large range of thickness, it has been found especially suitable for sheets from .025" to .063" thick and the thickness of sheets 12 and 13 is preferably the same or slightly less than that of sheet 11. Since the cost of titanium sheet is about 25 times that of stainless steel, it is obvious that the thicker the titanium sheet used, the greater is the monetary saving effected by my invention.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. The method of bending a long thin sheet of titanium to the shape of a curved die face which comprises the steps of resistance brazing the inner ends of thin short stainless steel sheets to the opposite ends of said sheets by interposing strips of brazing alloy in face adjacency respectively between said titanium sheet and each of said stainless steel sheets, pressing each of said strips between the titanium sheet and the stainless steel sheet adjacent thereto and concurrently passing electrical current therethrough and progressively along a line across said sheets with intensity and limited duration sufficient to heat each of said strips along said line to brazing temperature at the melting temperature of said alloy; heating said die face to a temperature within the range of 400° to 800° F.; placing the center portion of said long sheet against the center of said die face; and pulling the outer ends of said short sheets to stretch said long sheet beyond its elastic limit and along said die face to conform said long sheet to said die face.

2. The method set forth in claim 1, in which the initial length of said long sheet is substantially less than the length of said die face.

3. The method of bending a long thin sheet of titanium to the shape of a curved die face which comprises the steps of covering the end portions only of the top face of said sheet with thin layers of 85% silver-15% manganese alloy; placing the bottom faces of the inner ends of two short sheets of stainless steel on said thin layers; running an electrically energized welding roller along the tops of said short sheets near the inner ends thereof and passing sufficient current therefrom through said layers to said titanium sheet to heat portions of said layers to brazing temperature at the melting temperature of said silver-manganese alloy thereby securely bond said short and long sheets together; heating said die face to a temperature within the range of 400° to 800° F.; placing the center portion of the bottom face of said long sheet against the center of the die face; and pulling down said short sheets to stretch said long sheet beyond its elastic limit and along said die face to conform said long sheet to said die face.

References Cited in the file of this patent

UNITED STATES PATENTS

| | | |
|---|---|---|
| 661,615 | Marwick et al. | Nov. 13, 1900 |
| 853,862 | Buck | May 14, 1907 |
| 1,724,323 | Stoddard | Aug. 13, 1929 |
| 2,006,468 | Longren | July 2, 1935 |
| 2,161,430 | Potchen | June 6, 1939 |
| 2,279,965 | Berliner et al. | Apr. 14, 1942 |
| 2,464,169 | Bentley | Mar. 8, 1949 |
| 2,752,982 | Lalli | July 3, 1956 |
| 2,759,513 | Green | Aug. 21, 1956 |
| 2,768,271 | Meredith | Oct. 23, 1956 |
| 2,798,843 | Slomin | July 9, 1957 |
| 2,808,501 | Kilpatrick et al. | Oct. 1, 1957 |

OTHER REFERENCES

"The Welding Encyclopedia," 12th ed., 1947, p. 632, pub. by the Welding Engineer Pub. Co.

"The Handbook on Titanium Metal," 7th ed. (1953), pp. 79–84, pub. by the Titanium Metals Corp.

The Blair Tension Method, copyright 1955, Blair Equip. Co., p. 3, Blair St., Flint 4, Mich.